(12) United States Patent
Hebgen et al.

(10) Patent No.: US 11,506,835 B2
(45) Date of Patent: Nov. 22, 2022

(54) OPTICAL FIBER WITH LOW MACROBEND LOSS AT LARGE BEND DIAMETER

(71) Applicant: CORNING INCORPORATED, Corning, NY (US)

(72) Inventors: Peter Gottfried Hebgen, Wilmington, NC (US); Hazel Benton Matthews, III, Wilmington, NC (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/082,688

(22) Filed: Oct. 28, 2020

(65) Prior Publication Data

US 2021/0157048 A1 May 27, 2021

Related U.S. Application Data

(60) Provisional application No. 62/945,930, filed on Dec. 10, 2019, provisional application No. 62/939,828, filed on Nov. 25, 2019.

(51) Int. Cl.
*G02B 6/028* (2006.01)
*G02B 6/02* (2006.01)

(52) U.S. Cl.
CPC ....... *G02B 6/0281* (2013.01); *G02B 6/02009* (2013.01); *G02B 6/02342* (2013.01); *G02B 6/02395* (2013.01)

(58) Field of Classification Search
None
See application file for complete search history.

(56) References Cited

U.S. PATENT DOCUMENTS

| 7,689,085 | B1 | 3/2010 | Mishra |
| 7,929,818 | B1* | 4/2011 | Bickham ............... G02B 6/0286 385/124 |
| 2013/0114935 | A1* | 5/2013 | Bookbinder ......... G02B 6/0281 385/124 |

(Continued)

OTHER PUBLICATIONS

International Search Report and Written Opinion of the International Searching Authority; PCT/US2020/057882; dated Feb. 3, 2021; 3 Pages; European Patent Office.

*Primary Examiner* — Chris H Chu
(74) *Attorney, Agent, or Firm* — Kevin L. Bray

(57) ABSTRACT

The present disclosure provides optical fibers that exhibit low macrobend loss at 1550 nm at bend diameters greater than 40 mm. The relative refractive index profile of the fibers includes a trench cladding region having a trench volume configured to minimize macrobend loss at large bend diameters. The thickness and/or depth of the trench cladding region are controlled to reduce trench volume to a degree consistent with reducing macrobend loss at bend diameters greater than 40 mm. The optical fiber includes an outer cladding region that surrounds and is directly adjacent to the trench cladding region and an optional offset cladding region between the trench cladding region and the core region. In some embodiments, the core region is a segmented core region that includes inner and outer core regions. The low macrobend loss available from the optical fibers makes them particularly suitable for applications in submarine telecommunications systems.

35 Claims, 9 Drawing Sheets

(56) References Cited

U.S. PATENT DOCUMENTS

| | | | |
|---|---|---|---|
| 2013/0136408 A1* | 5/2013 | Bookbinder | G02B 6/02266 385/124 |
| 2014/0169748 A1 | 6/2014 | Lingle et al. | |
| 2017/0017032 A1* | 1/2017 | Mishra | G02B 6/03655 |
| 2017/0097465 A1 | 4/2017 | Bookbinder et al. | |
| 2018/0031761 A1* | 2/2018 | Bookbinder | G02B 6/03616 |
| 2018/0252866 A1* | 9/2018 | Bookbinder | G02B 6/03627 |

* cited by examiner

OPTICAL FIBER WITH LOW MACROBEND LOSS AT LARGE BEND DIAMETER

This application claims the benefit of priority to U.S. Provisional Application Ser. No. 62/939,828 filed on Nov. 25, 2019 and to U.S. Provisional Application Ser. No. 62/945,930 filed on Dec. 10, 2019, the content of which is relied upon and incorporated herein by reference in its entirety.

FIELD OF THE DISCLOSURE

This disclosure pertains to optical fibers and cables. More particularly, this disclosure pertains to optical fibers and cables configured for submarine environments. Most particularly, this disclosure pertains to optical fibers and cables having low macrobend loss at large bend diameters.

BACKGROUND OF THE DISCLOSURE

Telecommunication systems require optical fibers capable of transmitting optical signals over long distances with low loss at high data rates. Transmission capacity has been improved through advances in wavelength division multiplexing and modulation formats. Wavelength division multiplexing increases the number of transmission channels, while advanced modulation formats have increased the data rate per channel. The primary sources of signal loss are attenuation loss and bending loss. Attenuation loss can be reduced by minimizing Rayleigh scattering in the fiber core, which can be achieved through fabricating optical fiber cores from materials having high purity and highly uniform composition.

Bend loss includes losses due to microbending and macrobending. Microbending losses are caused by high frequency mechanical perturbations originating from external stimuli in the deployment environment of the optical fiber. Examples include lateral contact of the optical fiber with surfaces in a cable (e.g. tube wall). Physically, microbends correspond to randomly localized small radius bends (less than about 1 mm) that act along the length of the optical fiber. Microbends lead to mode coupling in the optical fiber and dissipation of power in the fundamental mode of single mode fiber into higher order modes. Macrobending losses are signal losses caused by bending or wrapping of the optical fiber. It is often necessary to physically bend optical fiber to meet installation requirements in the field (e.g. around corners). The bend diameter is large (greater than about 2 mm and typically on the order of tens of millimeters) and the loss mechanism is leakage of light. As the optical fiber bends, a fraction of the optical signal refracts out of the core and is dissipated in the protective coating surrounding the fiber. The amount of lost signal increases as the optical fiber is bent more tightly (smaller bend diameter).

Currently, there is increased demand for optical fiber and cables for use in submarine applications. The demand is driven by the rapid growth of internet traffic among different continents. A submarine cable is designed to protect the fibers inside from water damage and other mechanical damages. The size of deep-sea cable is typically around 17-20 mm in diameter. Optical fibers designed for terrestrial systems are currently used in submarine applications. The mechanical environment experienced by optical fiber deployed in submarine systems, however, differs from terrestrial applications and macrobend losses in particular are unreasonably high in submarine systems.

There is accordingly a need for optical fibers having reduced macrobend loss in the deployment environment of submarine transmission systems.

SUMMARY

The present disclosure provides optical fibers with low macrobend loss in the deployment environment of submarine transmission systems. The optical fibers have a relative refractive index profile designed to minimize macrobend loss at bending diameters typically encountered in submarine systems. The relative refractive index profile includes a cladding with a trench configured to minimize macrobend loss at bend diameters greater than 40 mm. In particular, a reduction in trench volume relative to standard submarine fiber is shown to lead to a reduction in macrobend loss.

The present description extends to:

An optical fiber comprising:
a core region, the core region having a radius $r_1$ in a range from 4.0 µm to 10.0 µm and a relative refractive index profile $\Delta_1$ having a maximum relative refractive index $\Delta_{1max}$ in a range from −0.05% to 0.05%;
a cladding region surrounding and directly adjacent to the core region, the cladding region comprising:
 a trench cladding region surrounding the core region, the trench cladding region and having a radius $r_3$, a relative refractive index $\Delta_3$, and a trench volume less than 35% µm²; and
 an outer cladding region surrounding and directly adjacent to the trench cladding region, the outer cladding region having a radius $r_4$ and a relative refractive index $\Delta_4$ in a range from −0.45% to −0.15%; and
wherein the optical fiber has a macrobend loss at 1550 nm, as determined by a mandrel wrap test using a mandrel with a diameter of 50 mm, less than 0.001 dB/turn.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
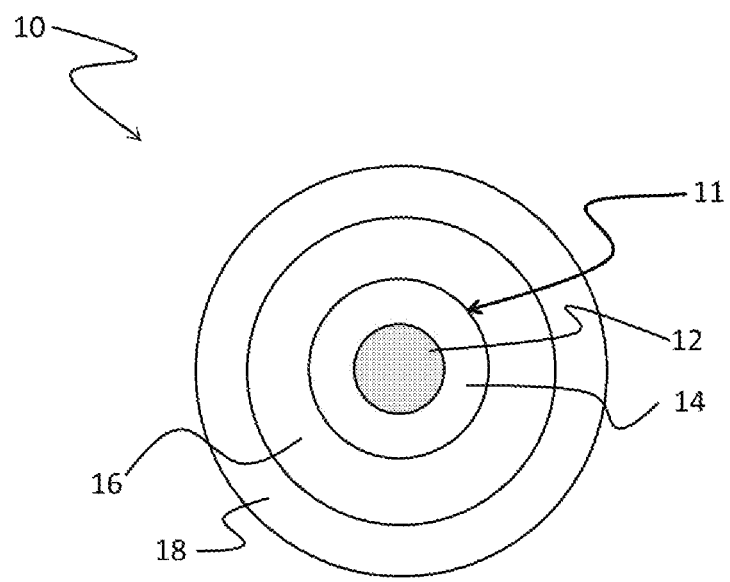
FIG. 1 is a schematic view of a coated optical fiber according to one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims that follow, reference will be made to a number of terms which shall be defined to have the following meanings:

"Include," "includes," or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1 to 3, from about 1 to 2, and from about 2 to 3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, "comprising" is an open-ended transitional phrase. A list of elements following the transitional phrase "comprising" is a non-exclusive list, such that elements in addition to those specifically recited in the list may also be present.

The term "wherein" is used as an open-ended transitional phrase, to introduce a recitation of a series of characteristics of the structure.

The terms "comprising," and "comprises," e.g., "A comprises B," is intended to include as a special case the concept of "consisting," as in "A consists of B."

The term "or," as used herein, is inclusive; more specifically, the phrase "A or B" means "A, B, or both A and B." Exclusive "or" is designated herein by terms such as "either A or B" and "one of A or B," for example.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but are rigidly or flexibly joined through one or more intervening materials. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other.

"Optical fiber" refers to a waveguide having a glass portion surrounded by a coating. The glass portion includes a core and a cladding, and is referred to herein as a "glass fiber".

"Radial position", "radius", or the radial coordinate "r" refers to radial position relative to the centerline (r=0) of the glass fiber.

The term "mode" refers to guided mode. A single-mode optical fiber is an optical fiber designed to support only the fundamental LP01 modes over a substantial length of the optical fiber (e.g., at least several meters), but that under certain circumstances can support multiple modes over short distances (e.g., tens of centimeters). The optical fibers disclosed herein are preferably single-mode optical fibers at a wavelength of 1550 nm.

The "operating wavelength" $\lambda_{op}$ of an optical fiber is the wavelength at which the optical fiber is operated. The operating wavelength corresponds to the wavelength of a guided mode. Representative operating wavelengths include 850 nm, 980 nm, 1060 nm, 1310 nm and 1550 nm, which are commonly used in telecommunications systems, optical data links, and data centers. Although a particular operating wavelength may be specified for an optical fiber, it is understood that a particular optical fiber can operate at multiple operating wavelengths and/or over a continuous range of operating wavelengths. Characteristics such as modal bandwidth and mode field diameter may vary with the operating wavelength and the relative refractive index profile of a particular optical fiber may be designed to provide optimal performance at a particular operating wavelength, a particular combination of operating wavelengths, or particular continuous range of operating wavelengths.

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta$ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by $\Delta_{ave}$ given in Eq. (2) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100\frac{(n_i^2 - n_{ref}^2)}{2n_i^2} \qquad (1)$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by $\Delta$ (or "delta") or $\Delta$ % (or "delta %") and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \qquad (2)$$

where $r_{inner}$ is the inner radius of the region, $r_{outer}$ is the outer radius of the region, and $\Delta(r)$ is the relative refractive index of the region.

The term "$\alpha$-profile" refers to a relative refractive index profile $\Delta(r)$ that has the functional form defined in Eq. (3):

$$\Delta(r) = \Delta(r_0)\left[1 - \left[\frac{|r - r_0|}{(r_z - r_0)}\right]^\alpha\right] \qquad (3)$$

where $r_o$ is the radial position at which $\Delta(r)$ is maximum, $r_z > r_0$ is the radial position at which $\Delta(r)$ decreases to its minimum value, and r is in the range $r_i \leq r \leq r_f$, where $r_i$ is the initial radial position of the $\alpha$-profile, $r_f$ is the final radial position of the $\alpha$-profile, and $\alpha$ is a real number. $\Delta(r_0)$ for an $\alpha$-profile may be referred to herein as $\Delta_{max}$ or, when referring to a specific region i of the fiber, as $\Delta_{i,max}$. When the relative refractive index profile of the fiber core region is described by an $\alpha$-profile with $r_0$ occurring at the centerline (r=0) and $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \qquad (4)$$

"Effective area" of an optical fiber is defined as:

$$A_{eff} = \frac{2\pi\left[\int_0^\infty (f(r))^2 r dr\right]^2}{\int_0^\infty (f(r))^4 r dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm, unless otherwise specified.

The "mode field diameter" or "MFD" of an optical fiber is defined in Eq. (5) as:

$$MFD = 2w \tag{5}$$

$$w^2 = 2 \frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal and is reported herein for a wavelength of 1550 nm, unless otherwise specified. Specific indication of the wavelength will be made when referring to mode field diameter herein for wavelengths other than 1550 nm. Unless otherwise specified, mode field diameter refers to the $LP_{01}$ mode at the specified wavelength.

"Trench" or "trench region" or "trench cladding region" refers to the portion of the cladding surrounded by and directly adjacent to the outer cladding region. A trench is situated between the outer radius $r_1$ of the core and the inner radius $r_3$ of the outer cladding region and has a relative refractive index $\Delta_3$ less than the relative refractive index $\Delta_4$ of the outer cladding region. In some embodiments, a trench is directly adjacent to the core. In other embodiments, an offset cladding region surrounds and is directly adjacent to the core, and a trench surrounds and is directly adjacent to the offset cladding region, where the offset cladding region has a relative refractive index $\Delta_2$ greater than or equal to the relative refractive index $\Delta_4$ of the outer cladding region.

"Trench volume" is defined as:

$$V_{Trench} = \left| 2 \int_{r_{Trench,inner}}^{r_{Trench,outer}} (\Delta_{Trench}(r) - \Delta_4(r)) r dr \right| \tag{6}$$

where $r_{Trench,inner}$ is the inner radius of the trench region, $r_{Trench,outer}$ is the outer radius of the trench region, $\Delta_{Trench}(r) = \Delta_3(r)$ is the relative refractive index of the trench region, and $\Delta_4(r)$ is the relative refractive index of the outer cladding of the glass fiber. In embodiments in which a trench is directly adjacent to the core, $r_{Trench,inner}$ is $r_1$, $r_{Trench,outer}$ is $r_3$, and $\Delta_{Trench}$ is $\Delta_3$. In embodiments in which a trench is directly adjacent to an offset cladding region, $r_{Trench,inner}$ is $r_2$, $r_{Trench,outer}$ is $r_3$, and $\Delta_{Trench}$ is $\Delta_3$. Trench volume is defined as an absolute value and has a positive value. Trench volume is expressed herein in units of % Δ–micron², % Δ–μm², or %–micron², %–μm², whereby these units can be used interchangeably herein.

"Chromatic dispersion", herein referred to as "dispersion" unless otherwise noted, of an optical fiber is the sum of the material dispersion, the waveguide dispersion, and the intermodal dispersion. In the case of single mode waveguide fibers, the inter-modal dispersion is zero. Dispersion values in a two-mode regime assume intermodal dispersion is zero. Dispersion is reported herein at a wavelength of 1550 nm and is expressed in units of ps/nm-km.

The cutoff wavelength of an optical fiber is the minimum wavelength at which the optical fiber will support only one propagating mode. Cutoff wavelength will be reported herein as a cable cutoff wavelength. The cable cutoff wavelength is based on a 22-meter cabled fiber length. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The term "bend diameter" refers to the diameter of the mandrel used to determine macrobend loss using the mandrel wrap test specified in the standard TIA-455-62: FOTP-62 IEC-60793-1-47 Optical Fibres—Part 1-47: Measurement Methods and Test Procedures—Macrobending Loss, by Telecommunications Industry Association (TIA).

The optical fibers disclosed herein include a core region, a cladding region surrounding the core region, and a coating surrounding the cladding region. The core region and cladding region are glass. The cladding region includes multiple regions that differ in relative refractive index. The multiple cladding regions are preferably concentric regions. In preferred embodiments, the cladding region includes a trench region. The trench region surrounds the core region and is surrounded by and directly adjacent to an outer cladding region. In some embodiments, the trench region is directly adjacent to the core region. In other embodiments, the trench region is directly adjacent to an offset cladding region and the offset cladding region is directly adjacent to the core region. The core region, cladding region, trench region, and outer cladding region are also referred to as core, cladding, trench, and outer cladding, respectively. The offset cladding region is optional and may also be referred to herein as an offset.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the offset cladding region, radial position $r_3$ and relative refractive index $\Delta_3$ or $\Delta_3(r)$ refer to the trench cladding region, radial position $r_4$ and relative refractive index $\Delta_4$ or $\Delta_4(r)$ refer to the outer cladding region, radial position $r_5$ refers to the primary coating, radial position $r_6$ refers to the secondary coating, and radial position $r_7$ refers to the optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_4$ min. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the core region is the central region of the glass fiber and is substantially cylindrical in shape, and that a surrounding optional offset cladding region, a surrounding trench cladding region, a surrounding outer cladding region, a surrounding primary coating, a surrounding secondary coating, and a surrounding tertiary coating are substantially annular in shape. Annular regions may be characterized in terms of an inner radius and an outer radius. Radial positions $r_1$, $r_2$, $r_3$, $r_4$, $r_5$, $r_6$, and $r_7$ refer herein to the outermost radii of the core, offset cladding, trench cladding, outer cladding, primary coating, secondary coating, and tertiary coating, respectively. The radius $r_6$ also corresponds to the outer radius of the optical fiber in embodiments without a tertiary coating. When a tertiary coating is present, the radius $r_7$ corresponds to the outer radius of the optical fiber. The radius $r_4$ corresponds to the outer radius of the glass fiber. In some embodiments, the core region is a segmented core region having an inner core region with radius $r_a<r_1$ and an outer core region having radius $r_1$ that surrounds and is directly adjacent to the inner core region.

When two regions are directly adjacent to each other, the outer radius of the inner of the two regions coincides with the inner radius of the outer of the two regions. In one embodiment, for example, the glass fiber includes a trench cladding region surrounded by and directly adjacent to an outer cladding region. In such an embodiment, the radius $r_3$ corresponds to the outer radius of the trench cladding region and the inner radius of the outer cladding region. In embodiments in which the relative refractive index profile includes a trench cladding region directly adjacent to the core, the radial position $r_1$ corresponds to the outer radius of the core and the inner radius of the trench cladding region.

The following terminology applies to embodiments in which the relative refractive index profile includes an offset cladding region surrounding and directly adjacent to the core region, a trench cladding region surrounding and directly adjacent to the offset cladding region, an outer cladding region surrounding and directly adjacent to the trench cladding region, a primary coating surrounding and directly adjacent to the outer cladding region, and a secondary coating surrounding and directly adjacent to the primary coating. The difference between radial position $r_2$ and radial position $r_1$ is referred to herein as the thickness of the offset cladding region. The difference between radial position $r_3$ and radial position $r_2$ is referred to herein as the thickness of the trench cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

The following terminology applies to embodiments in which a trench cladding region is directly adjacent to a core region and an outer cladding region is directly adjacent the trench cladding region. The difference between radial position $r_3$ and radial position $r_1$ is referred to herein as the thickness of the trench cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

As will be described further hereinbelow, the relative refractive indices of the core region, offset cladding region, trench cladding region, and outer cladding region differ. Each of the regions is formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index are formed through non-uniform spatial distributions of dopants and/or through incorporation of different dopants in different regions. Refractive index varies approximately linearly with the concentration of the updopant or downdopant. For example, each 1 wt % Cl as a dopant in silica glass increases the relative refractive index by about 0.083% and each 1 wt % F as a dopant in silica glass decreases the relative refractive index by about 0.32%.

The coatings formed on glass fibers are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "(meth)acrylate" means methacrylate, acrylate, or a combination of methacrylate and acrylate.

Reference will now be made in detail to illustrative embodiments of the present description.

The present description relates to glass fibers and optical fibers having low macrobend loss at bend diameters greater than 40 mm. Bend diameters greater than 40 mm are commonly encountered in the deployment environment of submarine optical fibers. As described herein, macrobend loss can be mitigated through proper design of the refractive index profile of the optical fiber. In particular, inclusion of a trench cladding region between the core region and the cladding region reduces macrobend loss. The trench cladding region disclosed herein has been designed to minimize macrobend loss at bend diameters greater than 40 mm. Optical fibers conventionally used in submarine systems has been optimized to minimize macrobend loss at small bend diameters (e.g. 20 mm or less). It has been determined herein, however, that optical fibers designed to minimize macrobend loss at small bend diameters exhibit high macrobend losses at large bend diameters (e.g. 40 mm or greater). That is, the macrobend loss of the optical fiber depends on the prevalent bend diameters in the deployment environment of the optical fiber and the relative refractive index profile of the optical fiber accordingly needs to be tailored to the prevalent bend diameters. The relative refractive index profile disclosed herein includes a trench cladding region that minimizes macrobend losses at bend diameters of 40 mm or greater. In particular, it is demonstrated that relative to optical fibers that minimize macrobend loss at bend diameters of 20 mm or less, a reduction in trench volume of the trench cladding region leads to a reduction in macrobend losses at bend diameters of 40 mm or greater.

One embodiment relates to an optical fiber. An optical fiber includes a glass fiber surrounded by a coating. An example of an optical fiber is shown in schematic cross-sectional view in FIG. 1. Optical fiber 10 includes a glass fiber 11 surrounded by primary coating 16 and secondary coating 18. Further description of glass fiber 11, primary coating 16, and secondary coating 18 is provided below.

Figure 2:
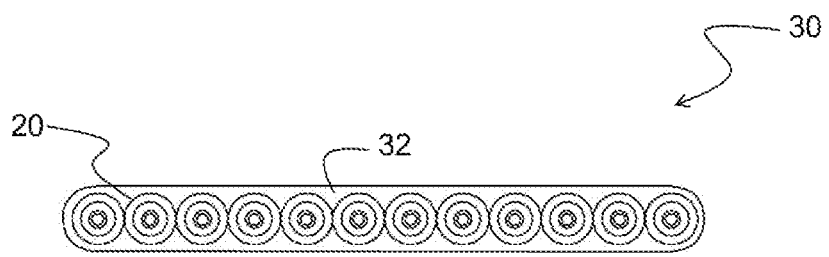
FIG. 2 is a schematic view of a representative optical fiber ribbon.

FIG. 2 illustrates an optical fiber ribbon 30. The ribbon 30 includes a plurality of optical fibers 20 and a matrix 32 encapsulating the plurality of optical fibers. Optical fibers 20 include a core region, a cladding region, a primary coating, and a secondary coating as described above. Optical fibers 20 may also include a tertiary coating as noted above. The secondary coating may include a pigment. The optical fibers 20 are aligned relative to one another in a substantially planar and parallel relationship. The optical fibers in fiber optic ribbons are encapsulated by the ribbon matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use. The ribbon matrix 32 can be formed from the same composition used to prepare a secondary coating, or the ribbon matrix 32 can be formed from a different composition that is otherwise compatible for use.

Figure 3:
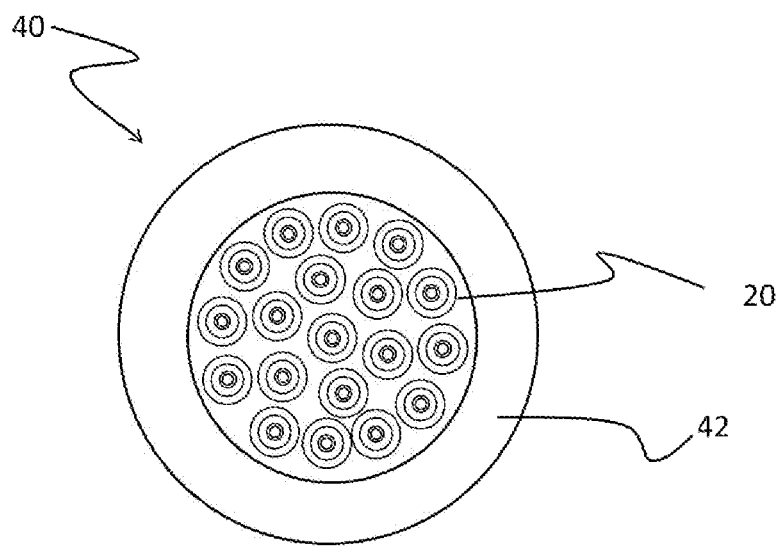
FIG. 3 is a schematic view of a representative optical fiber cable.

FIG. 3 illustrates an optical fiber cable 40. Cable 40 includes a plurality of optical fibers 20 surrounded by jacket 42. Optical fibers 20 may be densely or loosely packed into a conduit enclosed by inner surface 44 of jacket 42. The number of fibers placed in jacket 42 is referred to as the "fiber count" of optical fiber cable 40. The jacket 42 is formed from an extruded polymer material and may include multiple concentric layers of polymers or other materials. Optical fiber cable 40 may include one or more strengthening members (not shown) embedded within jacket 42 or placed within the conduit defined by inner surface 44. Strengthening members include fibers or rods that are more rigid than jacket 42. The strengthening member is made from metal, braided steel, glass-reinforced plastic, fiberglass, or other suitable material. Optical fiber cable 40 may include other layers surrounded by jacket 42 (e.g. armor layers, moisture barrier layers, rip cords, etc.). Optical fiber cable 40 may have a stranded, loose tube core or other fiber optic cable construction.

Glass Fiber.

The optical fibers disclosed herein include a glass fiber with a core region and a cladding region surrounding the core region along with a coating surrounding the cladding region. The core region and cladding region are glass. Glass fiber 11 includes a core region 12 and a cladding region 14, as is familiar to the skilled artisan. Core region 12 has a higher refractive index than cladding region 14 and glass fiber 11 functions as a waveguide.

In many applications, the core region and cladding region have a discernible core-cladding boundary. Alternatively, the core region and cladding region can lack a distinct boundary. One type of fiber is a step-index fiber. Another type of fiber is a graded-index fiber, which has a core region with a refractive index that varies with distance from the fiber center. Examples of graded-index fibers are fibers with a core region having a relative refractive index profile with an α-profile defined by Eq. (3) above.

Figure 4A:
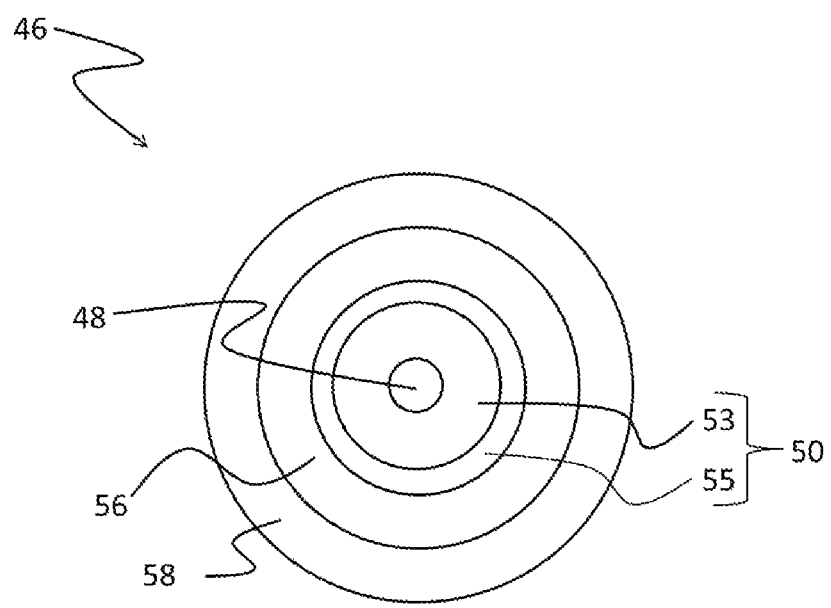
FIG. 4A depicts a cross-sectional view of an optical fiber having a core region, a trench cladding region, an outer cladding region, a primary coating, and a secondary coating.
Figure 4B:
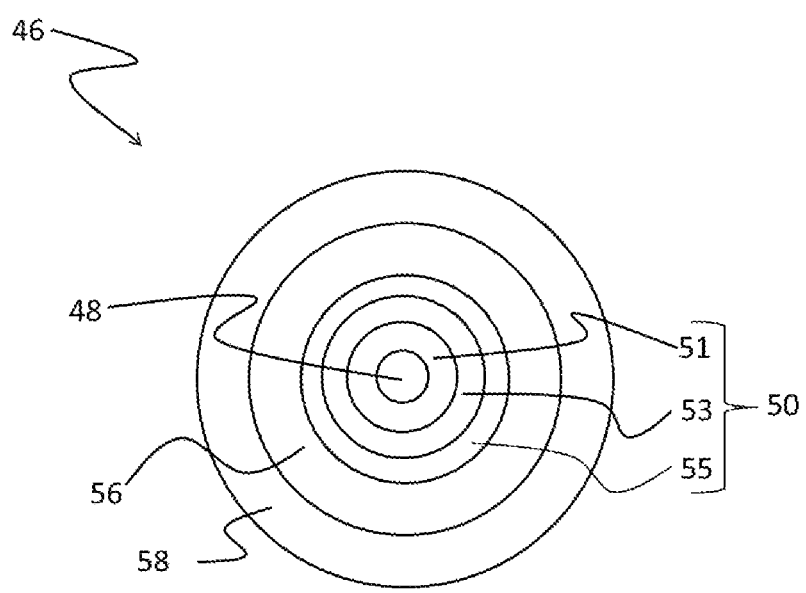
FIG. 4B depicts a cross-sectional view of an optical fiber having a core region, an offset cladding region, a trench cladding region, an outer cladding region, a primary coating, and a secondary coating.

Schematic cross-sectional depictions of an optical fiber are shown in FIGS. 4A and 4B. In FIG. 4A, optical fiber 46 includes core region 48, cladding region 50, primary coating 56, and secondary coating 58. Cladding region 50 includes trench cladding region 53 and outer cladding region 55. In FIG. 4B, optical fiber 46 includes core region 48, cladding region 50, primary coating 56, and secondary coating 58. Cladding region 50 includes offset cladding region 51, trench cladding region 53, and outer cladding region 55.

In one embodiment (e.g. FIG. 4A), the optical fiber includes a trench cladding region surrounding a core, an outer cladding region surrounding the trench cladding region, a primary coating surrounding the outer cladding region, and a secondary coating surrounding the primary coating. The trench cladding region is directly adjacent to the core region, the outer cladding region is directly adjacent to the trench cladding region, the primary coating is directly adjacent to the outer cladding region, and the secondary coating is directly adjacent to the primary coating. A tertiary layer (e.g. ink layer) optionally surrounds or is directly adjacent to the secondary coating in the foregoing embodiment.

In another embodiment (e.g. FIG. 4B), the optical fiber includes an offset cladding region surrounding a core, a trench cladding region surrounding the offset cladding region, an outer cladding region surrounding the trench cladding region, a primary coating surrounding the outer cladding region, and a secondary coating surrounding the primary coating. The offset cladding region is directly adjacent to the core region, the trench cladding region is directly adjacent to the offset cladding region, the outer cladding region is directly adjacent to the trench cladding region, the primary coating is directly adjacent to the outer cladding region, and the secondary coating is directly adjacent to the primary coating. A tertiary layer (e.g. ink layer) optionally surrounds or is directly adjacent to the secondary coating in the foregoing embodiment.

Figure 5A:
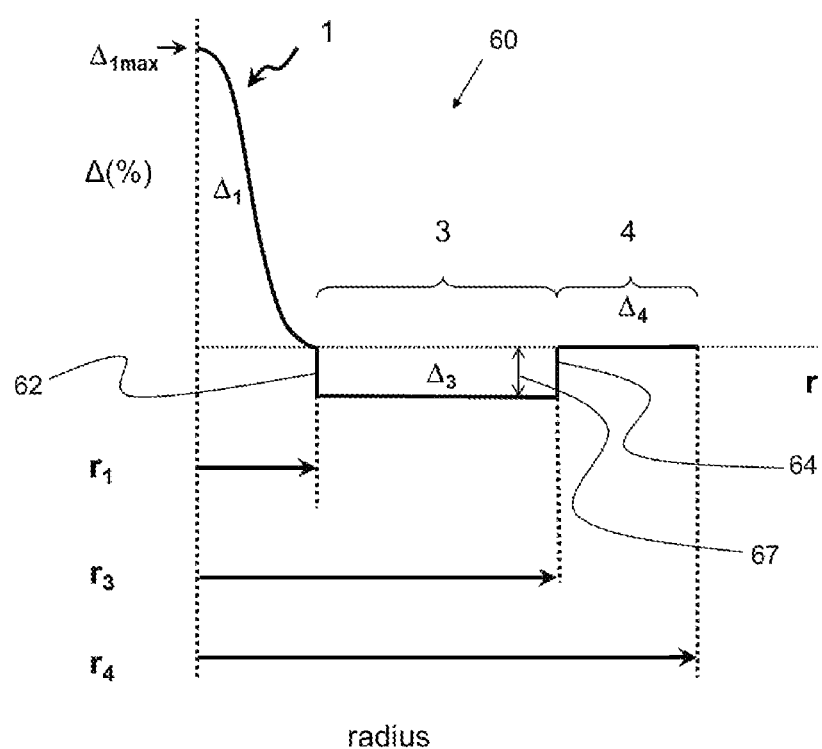
FIG. 5A depicts a relative refractive index profile of a glass fiber having a core region, a trench cladding region, and an outer cladding region.
Figure 5B:
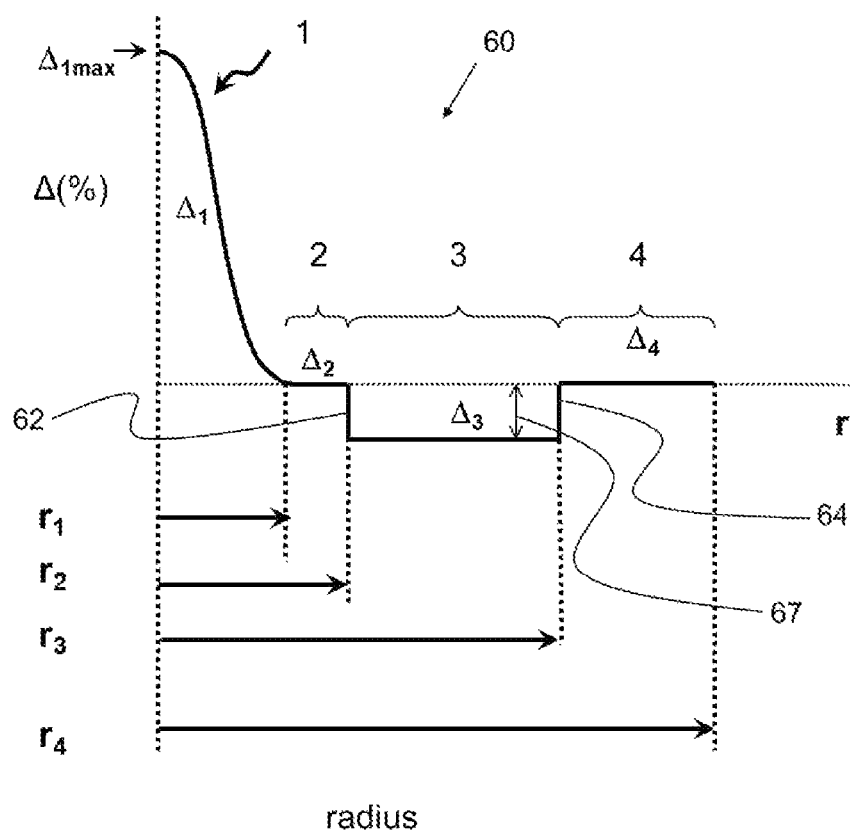
FIG. 5B depicts a relative refractive index profile of a glass fiber having a core region, an offset cladding region, a trench cladding region, and an outer cladding region.

Representative relative refractive index profiles for a glass fiber are presented in FIGS. 5A and 5B. FIG. 5A shows a graded index profile for a glass fiber 60 having a core region (1) with outer radius $r_1$ and relative refractive index $\Delta_1$ with maximum relative refractive index $\Delta_{1max}$, a trench cladding region (3) extending from radial position $r_1$ to radial position $r_3$ and having relative refractive index $\Delta_3$, and an outer cladding region (4) extending from radial position $r_3$ to radial position $r_4$ and having relative refractive index $\Delta_4$.

FIG. 5B shows a graded index profile for a glass fiber 60 having a core region (1) with outer radius $r_1$ and relative refractive index $\Delta_1$ with maximum relative refractive index $\Delta_{1max}$, an offset cladding region (2) extending from radial position $r_1$ to radial position $r_2$ and having relative refractive index $\Delta_2$, a trench cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$.

In the profiles of FIGS. 5A and 5B, the trench cladding region (3) has a constant or average relative refractive index $\Delta_3$ that is less than the relative refractive index $\Delta_4$ of the outer cladding region (4). Core region (1) has the highest average and highest maximum relative refractive index in the profile. Core region (1) may include a lower index region at or near the centerline (known in the art as a "centerline dip") (not shown).

In the embodiments shown in FIGS. 5A and 5B, the core region (1) of the glass fiber has a relative refractive index described by an α-profile. The radial position $r_0$ (corresponding to $\Delta_{1max}$) of the α-profile corresponds to the centerline ($r=0$) of the fiber and the radial position $r_z$ of the α-profile corresponds to the core radius $r_1$. In embodiments with a centerline dip, the radial position $r_0$ is slightly offset from the centerline of the fiber (not shown). In other embodiments, core region (1) shown in FIGS. 5A and 5B is a step index relative refractive index profile instead of an α-profile. In still other embodiments, core region (1) has a relative refractive index profile not defined by any of an α-profile or a step-index profile. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In FIG. 5A, transition region 62 from core region (1) to trench cladding region (3) and transition region 64 from trench cladding region (3) to outer cladding region (4) are shown as step changes. In FIG. 5B, transition region 62 from offset cladding region (2) to trench cladding region (3) and transition region 64 from trench cladding region (3) to outer cladding region (4) are shown as step changes. It is to be understood that a step change is an idealization and that transition region 62 and transition region 64 may not be strictly vertical in practice. Instead, transition region 62 and/or transition region 64 may have a slope or curvature. When transition region 62 and/or transition region 64 are non-vertical, the inner radius ($r_1$ or $r_2$) and outer radius ($r_3$) of trench cladding region (3) correspond to the mid-points of transition regions 62 and 64, respectively. The mid-points correspond to half of the depth 67 of the trench cladding region (3).

The relative ordering of relative refractive indices $\Delta_1$, $\Delta_3$, and $\Delta_4$ in the relative refractive index profile shown in FIGS. 5A and 5B satisfy the condition $\Delta_{1max}>\Delta_4>\Delta_3$.

The core region comprises silica glass. The silica glass of the core region is undoped silica glass, updoped silica glass, and/or downdoped silica glass. In one embodiment, the silica glass of the core region is Ge-free; that is the core region comprises silica glass that lacks Ge. In another embodiment, the core region comprises silica glass doped with germanium dioxide ($GeO_2$). Embodiments of updoped silica glass include silica glass doped with an alkali metal oxide (e.g. $Na_2O$, $K_2O$, $Li_2O$, $Cs_2O$, or $Rb_2O$). Downdoped silica glass includes silica glass doped with F. In some embodiments, the core region is co-doped with alkali metal oxide and fluorine. The concentration of $K_2O$ in the core, expressed in terms of the amount of K, is in the range from 20 ppm to 1000 ppm, or 35 ppm to 500 ppm, or 50 ppm to 300 ppm, where ppm refers to parts per million by weight. Alkali metal oxides other than $K_2O$ are present in amounts corresponding to the equivalent molar amount of $K_2O$ as determined from the amount of K indicated above.

In some embodiments, the core region includes an updopant and a downdopant, where the concentration of updopant is highest at the centerline ($r=0$) (in embodiments without a centerline dip) or near the centerline ($r=0$) (in embodiments with a centerline dip) and lowest at the radius $r_1$ and the concentration of downdopant is lowest at the centerline ($r=0$) and highest at the radius $r_1$. In such embodiments, the relative refractive index $\Delta_1$ can have a positive value near the centerline ($r=0$) and decrease to a negative value at the radius $r_1$.

In one embodiment, the core region is a segmented core region that includes an inner core region with radius $r_a$ surrounded by an outer core region with radius $r_1$, where the inner core region comprises updoped or undoped silica glass and has a maximum relative refractive index $\Delta_{1max}$, and the outer core region comprises downdoped silica glass and has a negative minimum relative refractive index $\Delta_{1min}$, where $\Delta_{1max}>\Delta_{1min}$. The updoped silica glass of the inner core region includes an updopant or a combination of an updopant and downdopant. In embodiments in which the inner core region includes a combination of an updopant and downdopant, the relative concentrations of updopant and downdopant are adjusted to provide a net positive value or a net zero value of the maximum relative refractive index $\Delta_{1max}$. In embodiments in which the outer core region includes a combination an updopant and downdopant, the relative concentrations of updopant and downdopant are adjusted to provide a net negative value of the relative refractive index $\Delta_{1min}$. In one embodiment, the inner core region is silica glass doped with an alkali metal oxide and the outer core region is silica glass doped with F. In another embodiment, the inner core region is silica glass doped with an alkali metal and the outer core region is silica glass doped with F and Cl.

In embodiments with a segmented core, $\Delta_1$ (and $\Delta_{1max}$ and $\Delta_{1min}$) refer to the entirety of the core region, including the inner core region and the outer core region, $r_1$ corresponds to the outer radius of the outer core region, and $r_a$ corresponds to the outer radius of the inner core region. The boundary between the inner core region and outer core region occurs at radial position $r_a$, where $r_a<r_1$. In embodiments with a core region having a centerline dip, the core region is a segmented core region having a relative refractive index that increases from a value at $r=0$ to a maximum value $\Delta_{1max}$ at $r_a$ and decreases from the maximum value $\Delta_{1max}$ at $r_a$ to a minimum value $\Delta_{1min}$ at a radial position greater than $r_a$ and less than or equal to $r_1$.

In some embodiments, the relative refractive index of the core region of the glass fiber is described by an α-profile with an a value in the range from 1.5 to 10, or in the range from 1.7 to 8.0, or in the range from 1.8 to 6.0, or in the range from 1.9 to 5.0, or in the range from 1.95 to 4.5, or in the range from 2.0 to 4.0, or in the range from 10 to 100, or in the range from 11 to 40, or in the range from 12 to 30. As the value of a increases, the relative refractive profile more closely approaches a step index profile. In some embodiments with a segmented core region, either or both of the inner core region and outer core region has a relative refractive index described by an α-profile with an α value as described herein.

The outer radius $r_1$ of the core region is in the range from 4.0 μm to 10.0 μm, or in the range from 5.0 μm to 9.5 μm, or in the range from 6.0 μm to 9.0 μm. In some embodiments, the core region includes a segmented core region with a portion with a constant or approximately constant relative refractive index that has a width in the radial direction of at least 1.0 μm, or at least 2.0 μm, or at least 3.0 μm, or at least 4.0 μm, or at least 5.0 μm, or in the range from 1.0 μm to 6.0 μm, or in the range from 2.0 μm to 5.0 μm. In an embodiment, the portion of the segmented core region having a constant or approximately constant relative refractive index is an outer core region and has a relative refractive index of $\Delta_{1min}$. In embodiments with a segmented core region, the radius $r_a$ of the inner core region is in the range from 0.5 μm to 3.5 μm or in the range from 1.0 μm to 3.0 μm.

The relative refractive index $\Delta_1$ or $\Delta_{1max}$ of the core region is in the range from −0.05% to 0.05%, or in the range from −0.04% to 0.04%, or in the range from −0.03% to 0.03%, or in the range from −0.02% to 0.02%, or in the range from −0.01% to 0.01%. The minimum relative refractive index $\Delta_{1min}$ of the core region is in the range from −0.40% to −0.10%, or in the range from −0.35% to −0.15%, or in the range from −0.30% to −0.20%. The difference $\Delta_{1max}$ to $\Delta_{1min}$ is greater than 0.15%, or greater than 0.20%, or greater than 0.25%, or in the range from 0.15% to 0.35%, or in the range from 0.20% to 0.30%.

In embodiments having a segmented core region, the relative refractive index $\Delta_1$ or $\Delta_{1max}$ of the inner core region is in the range from −0.05% to 0.05%, or in the range from −0.03% to 0.03%, or in the range from −0.01% to 0.01%. The minimum relative refractive index $\Delta_{1min}$ of the outer core region is in the range from −0.40% to −0.10%, or in the range from −0.35% to −0.15%, or in the range from −0.30% to −0.20%. The difference $\Delta_{1max}$ to $\Delta_{1min}$ is greater than 0.15%, or greater than 0.20%, or greater than 0.25%, or in the range from 0.15% to 0.35%, or in the range from 0.20% to 0.30%.

In some embodiments, the relative refractive index of the core region or the inner core region is described by a step-index profile having a constant or approximately constant value corresponding to $\Delta_{1max}$.

In some embodiments, the cladding includes an offset cladding region directly adjacent the core region and a trench cladding region directly adjacent the offset cladding region. The offset cladding region has an inner radius $r_1$ as defined above and an outer radius $r_2$. The thickness $r_2-r_1$ of the offset cladding region is in the range from 0.5 μm to 5.0 μm, or in the range from 1.0 μm to 4.0 μm. The relative refractive index $\Delta_2$ of the offset cladding region is less than or equal to $\Delta_{1min}$ and/or greater than or equal to $\Delta_4$.

The trench cladding region comprises downdoped silica glass. The preferred downdopant is F (fluorine). The concentration of F (fluorine) is in the range from 0.5 wt % to 2.0 wt %, or in the range from 0.6 wt % to 1.5 wt %, or in the range from 0.7 wt % to 1.2 wt %.

The relative refractive index $\Delta_3$ or $\Delta_{3min}$ of the trench cladding region is in the range from −0.20% to −0.50%, or in the range from −0.25% to −0.45%, or in the range from −0.30% to −0.40%. The relative refractive index $\Delta_3$ is preferably constant or approximately constant. The difference between $\Delta_{1max}$ and $\Delta_3$ (or the difference between $\Delta_{1max}$ and $\Delta_{3min}$, or the difference between $\Delta_1$ and $\Delta_3$, or the difference between $\Delta_1$ and $\Delta_{3min}$) is greater than 0.20%, or greater than 0.25%, or greater than 0.30%, or greater than 0.40%, or in the range from 0.20% to 0.50%, or in the range from 0.25% to 0.45%.

The inner radius of the trench cladding region is $r_1$ (in embodiments without an offset cladding region) or $r_2$ (in embodiments with an offset cladding region) and has the values specified above. The outer radius $r_3$ of the trench cladding region is in the range from 12.0 μm to 30.0 μm, or in the range from 15.0 μm to 27.5 μm, or in the range from 17.5 μm to 25.0 μm. The thickness $r_3-r_1$ (in embodiments without an offset cladding region) or $r_3-r_2$ (in embodiments with an offset cladding region) of the trench cladding region is less than 20.0 μm, or less than 15.0 μm, or less than 12.5 μm, or less than 10.0 μm, or in the range from 5.0 μm to 20.0 μm, or in the range from 6.0 μm to 15.0 μm, or in the range from 7.0 μm to 12.0 μm.

The trench cladding region has a trench volume less than 35% μm², or less than 30% μm², or less than 25% μm², or less than 20% μm², or less than 15% μm², or less than 10% μm², or in the range from 5% μm² to 35% μm², or in the range from 10% μm² to 30% μm², or in the range from 10% μm² to 25% μm², or in the range from 12% μm² to 22% μm². Trench volume can be controlled by varying the thickness of the trench cladding region, the relative refractive index of the trench cladding region and/or the difference between the relative refractive index of the outer cladding region and the relative refractive index of the trench cladding region.

The relative refractive index $\Delta_4$ or $\Delta_{4max}$ of the outer cladding region is in the range from −0.45% to −0.15%, or in the range from −0.40% to −0.20%, or in the range from −0.35% to −0.25%. The relative refractive index $\Delta_4$ is preferably constant or approximately constant. The difference $\Delta_4-\Delta_3$ (or the difference $\Delta_4-\Delta_{3min}$, or the difference $\Delta_{4max}-\Delta_3$, or the difference $\Delta_{4max}-\Delta_{3min}$) is less than 0.15%, or less than 0.10%, or less than 0.05%, or in the range from 0.01% to 0.15%, or in the range from 0.02% to 0.10%.

The inner radius of the outer cladding region is $r_3$ and has the values specified above. The outer radius $r_4$ of the outer cladding region is in the range from 57.5 μm to 67.5 μm, or in the range from 60.0 μm to 65.0 μm, or in the range from 61.0 μm to 64.0 μm, or about 62.5 μm. The thickness $r_4-r_3$ of the outer cladding region is in the range from 10.0 μm to 50.0 μm, or in the range from 15.0 μm to 45.0 μm, or in the range from 20.0 μm to 40.0 μm, or in the range from 25.0 μm to 35.0 μm.

In one embodiment, the core region of the relative refractive index profiles is a segmented core region with radius $r_1$ corresponding to the outer radius of the outer core region along with an inner core region having an outer radius $r_a$ such that $r_a<r_1$. In one embodiment, each of the inner core region and outer core region has a relative refractive index profile described by an α-profile. In one embodiment, the inner core region has an α value less than 20, or less than 10, or less than 5.0 or less than 3.0 or less than 2.0, or in the range from 1.0 to 20, or in the range from 1.5 to 10, or in the range from 1.7 to 5.0, or in the range from 1.8 to 3.0, and the outer core region has an α value greater than 10, or greater than 20, or greater than 50, or greater than 100, or greater than 150, or greater than 200, or in the range from 20 to 300, or in the range from 50 to 250, or in the range from 100 to 200. In another embodiment, the inner core region has a relative refractive index profile described by an α-profile and the outer core region has a relative refractive index profile described by a step-index profile. In another embodiment, the inner core region has a relative refractive index profile described by an α-profile and the outer core region has a relative refractive index profile described by a rounded step-index profile.

In one embodiment, the inner core region is alkali-doped silica and the outer core region is halide-doped silica. Halide-doped silica includes silica doped with one or more of Cl, F, and Br. In one embodiment, the inner core region is silica doped with $K_2O$ and the outer core region is doped with F or a combination of F and Cl.

In embodiments in which each of the inner core region and outer core region has a relative refractive index profile described by an α-profile, the radius $r_a$ is determined by minimizing the function $\chi^2$ given in Eq. (7):

$$\chi^2 = \sum_{i=1}^{a}[f(r_i) - g(r_a) - \Delta(r_i)]^2 + \sum_{j=a}^{b}[g(r_j) - \Delta(r_j)]^2 \qquad (7)$$

where $f(r_i)$ is an α-profile function for the inner core region, $g(r_j)$ is an α-profile function for the outer core region, $g(r_a)$ is the value of $g(r_j)$ at $r_j=r_a$, $\Delta(r_i)$ is the measured relative refractive index profile of the inner core region, $\Delta(r_j)$ is the measured relative refractive index profile of the outer core region, the index "i" indexes radial positions $r_i$ in the inner core region, the index "j" indexes radial positions $r_j$ in the outer core region, $0<r_i<r_a$, $r_a \leq r_j \leq r_b$, the index "a" is the value of index "i" corresponding to $r_i=r_a$, the index "b" is the value of index "j" corresponding to $r_j=r_1$.

Optical Fiber Coatings.

The transmissivity of light through an optical fiber is highly dependent on the properties of the coatings applied to the glass fiber. The coatings typically include a primary coating and a secondary coating, where the secondary coating surrounds the primary coating and the primary coating contacts the glass fiber (which includes a central core region surrounded by a cladding region). The secondary coating is a harder material (higher Young's modulus (e.g. greater than 1400 MPa) than the primary coating and is designed to protect the glass fiber from damage caused by abrasion or external forces that arise during processing, handling, and installation of the optical fiber. The primary coating is a softer material (lower Young's modulus (e.g. less than 1 MPa) than the secondary coating and is designed to buffer or dissipates stresses that result from forces applied to the outer surface of the secondary coating. Dissipation of stresses within the primary coating attenuates the stress and minimizes the stress that reaches the glass fiber. The primary coating is especially important in dissipating stresses that arise due to the microbends that the optical fiber encounters when deployed in a cable. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the primary coating minimizes microbend-induced intensity losses The primary coating 16 preferably has a higher refractive index than the cladding region of the glass fiber in order to allow it to strip errant optical signals away from the core region. The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber may also include a tertiary coating (not shown) that surrounds the secondary coating. The tertiary coating may include pigments, inks or other coloring agents to mark the optical fiber for identification purposes and typically has a Young's modulus similar to the Young's modulus of the secondary coating.

Primary Coating Compositions.

The primary coating is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound or a combination of a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—$CH_2$—$CH_2$—), n-propoxylene (—O—$CH_2$—$CH_2$—$CH_2$—), isopropoxylene (—O—$CH_2$—CH($CH_3$)—, or —O—CH ($CH_3$)—$CH_2$—), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form $R_4$—$R_5$—O—(CH($CH_3$)$CH_2$—O)$_q$—C(O)CH=$CH_2$, where $R_4$ and $R_5$ are aliphatic, aromatic, or a mixture of both, and q=1 to 10, or $R_4$—O—(CH($CH_3$)$CH_2$—O)$_q$—C(O)CH=$CH_2$, where C(O) is a carbonyl group, $R_1$ is aliphatic or aromatic, and q=1 to 10.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule.

In some embodiments, the primary coating composition includes an N-vinyl amide monomer such as an N-vinyl lactam, or N-vinyl pyrrolidinone, or N-vinyl caprolactam.

In addition to a curable monomer and a curable oligomer, the curable primary coating composition also includes a polymerization initiator. The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiators and/or phosphine oxide photoinitiators. When used in the curing of the coating composition, the photoinitiator is present in an amount sufficient to enable rapid radiation curing.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

Secondary Coating—Compositions.

The secondary coating is a cured product of a curable secondary coating composition that includes a monomer, a photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. In one embodiment, the secondary coating is the radiation-cured product of a secondary coating composition that contains urethane acrylate monomers.

The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), iso-propoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer.

Multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater.

The curable secondary coating composition also includes a photoinitiator and optionally includes additives such as anti-oxidant(s), optical brightener(s), amine synergist(s), tackifier(s), catalyst(s), a carrier or surfactant, and a stabilizer as described above in connection with the curable primary coating composition.

Fiber Draw Process.

In a continuous optical fiber manufacturing process, a glass fiber is drawn from a heated preform and sized to a target diameter (typically 125 μm, corresponding to $r_4$=62.5 μm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

The wavelength of curing radiation is infrared, visible, or ultraviolet (UV). Representative wavelengths include wavelengths in the range from 250 nm to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g. Hg lamp), an LED source (e.g. a UVLED, visible LED, or infrared LED), or a laser source.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

EXAMPLES

The following examples illustrate optical fibers having cladding regions with a trench cladding region configured to minimize macrobend losses at bend diameters greater than 40 mm. The trench cladding region of the illustrative optical fibers have a relative refractive index $\Delta_3$ and/or a thickness $r_3-r_1$ (in embodiments without an offset cladding region) or $r_3-r_2$ (in embodiments with an offset cladding region) configured to provide a trench volume conducive to minimizing macrobend losses at bend diameters greater than 40 mm.

Macrobending.

Macrobending loss was determined using the mandrel wrap test specified in the standard TIA-455-62: FOTP-62 IEC-60793-1-47 Optical Fibres—Part 1-47: Measurement Methods and Test Procedures—Macrobending Loss, by Telecommunications Industry Association (TIA). In the mandrel wrap test, the fiber is wrapped one or more times around a smooth cylindrical mandrel having a specified diameter, and the increase in attenuation at a specified wavelength due to the bending is determined. Attenuation in the mandrel wrap test is expressed in units of dB/turn, where dB refers to decibels and one turn refers to one revolution of the fiber about the mandrel. Macrobending losses at a wavelength of 1550 nm were determined for selected examples using mandrels with diameters between 20 mm and 70 mm as described below.

Fiber Samples.

Figure 6A:
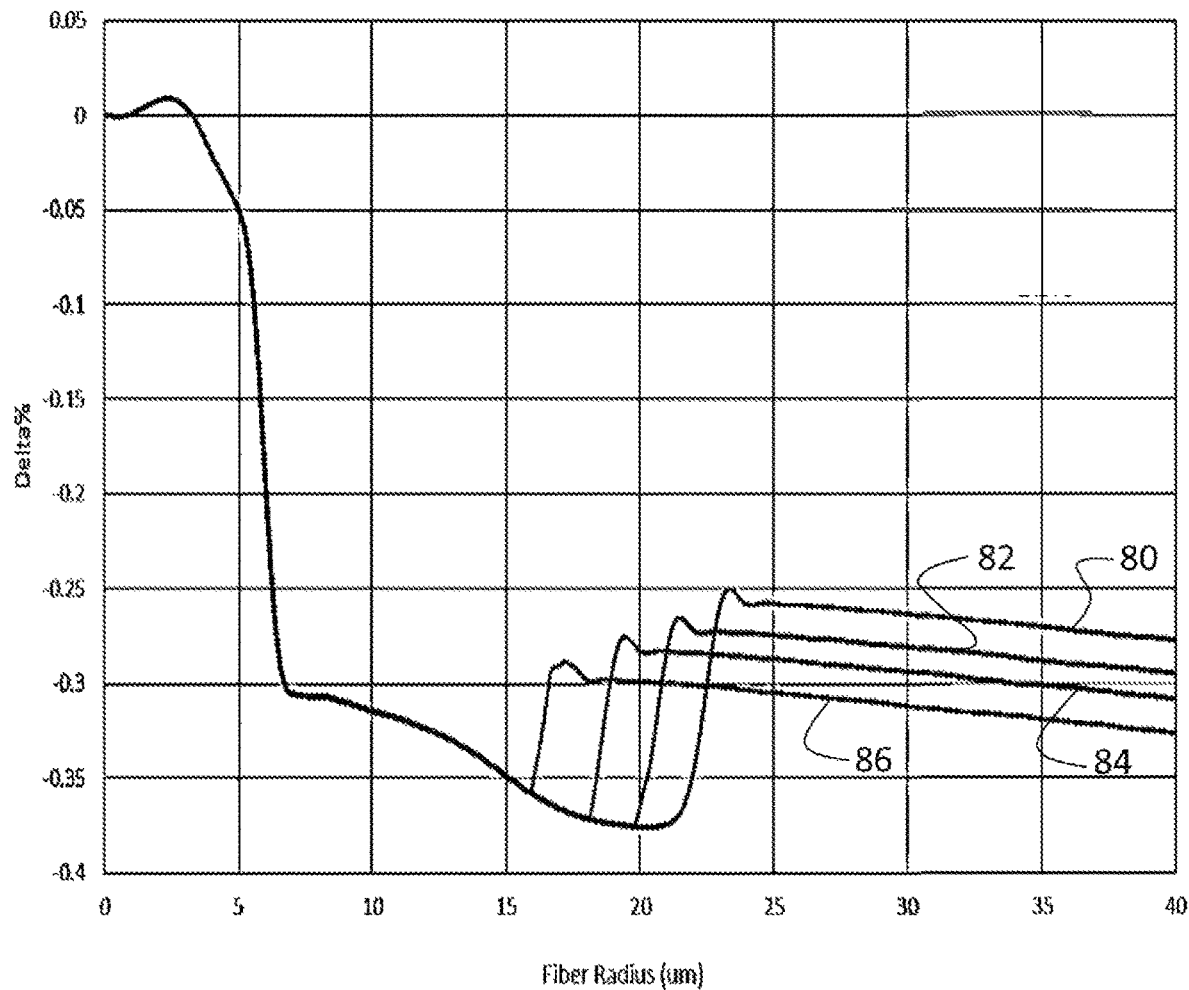
FIG. 6A depicts exemplary relative refractive index profiles of manufactured glass fibers.
Figure 6B:
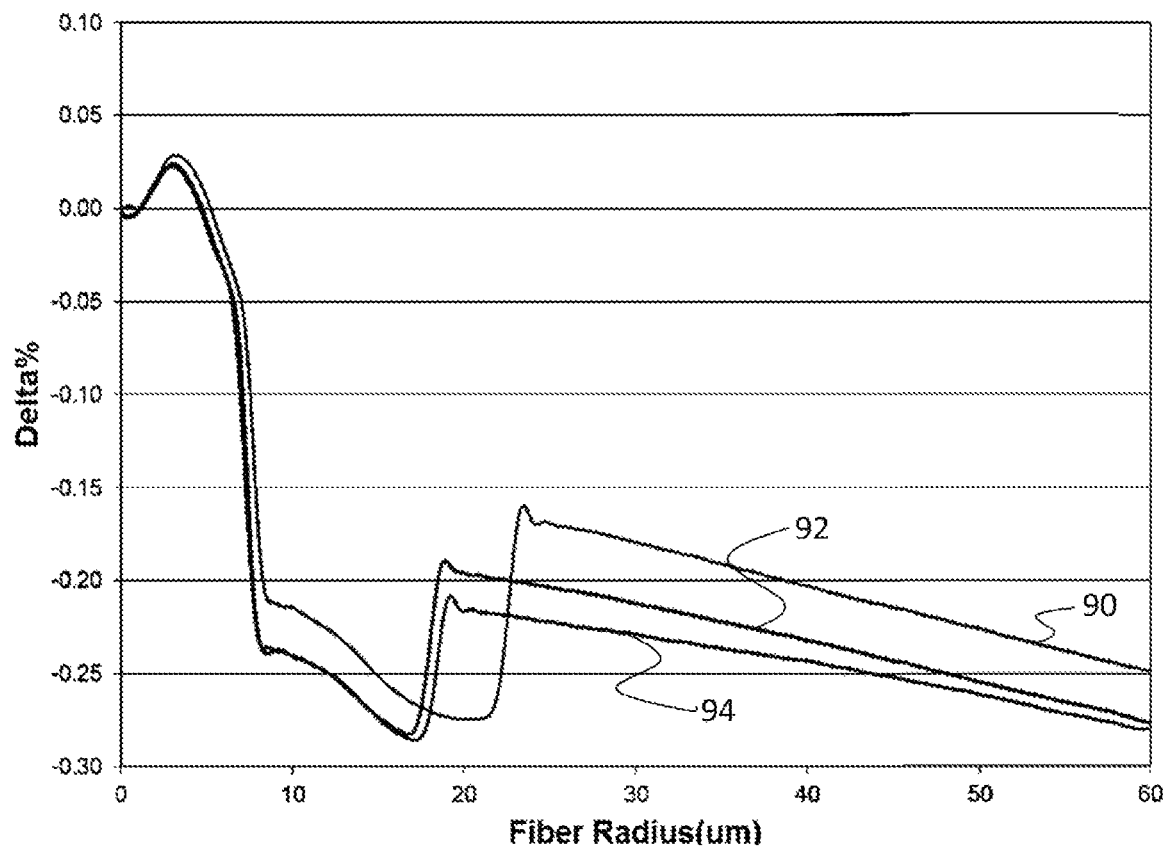
FIG. 6B depicts exemplary relative refractive index profiles of manufactured glass fibers.

A series of optical fiber samples with segmented cores were prepared and analyzed. The relative refractive index profiles of selected samples are shown in FIGS. 6A and 6B, and have the parameter values listed in Tables 1 and 2. Selected optical properties of the optical fiber samples are listed in Table 3. In each sample, an outer core region surrounded and was directly adjacent to an inner core region, a trench cladding region surrounded and was directly adjacent to the outer core region of the segmented core, and an outer cladding region surrounded and was directly adjacent to the trench cladding region, a primary coating surrounded and was directly adjacent to the outer cladding region, and a secondary coating surrounded and was directly adjacent to the primary coating. The outer diameter of the secondary coating was approximately 240 µm. None of the samples included an offset cladding region. Each sample included a centerline dip with a centerline relative refractive index $\Delta$ (r=0) of 0.0%, a value of $r_a$ coinciding with $\Delta_{1max}$, a value of $\Delta_{1min}$ occurring at $r_1$, and an outer cladding region with radius $r_4$=62.5 µm. In Tables 1 and 2, $\Delta_3$ and $\Delta_{3min}$ refer respectively to the average and minimum value of the relative refractive index of the trench cladding region between $r_1$ and $r_3$. The maximum relative refractive index $\Delta_{4max}$ of the outer cladding region is reported. The entries in the column labeled "Trace" correspond to reference numerals in FIGS. 6A, 6B, 7A, and 7B corresponding to each of the samples.

TABLE 1

| Sample | Trace | $r_a$ (µm) | $r_1$ (µm) | $r_3$ (µm) | $r_4$ (µm) |
|---|---|---|---|---|---|
| 1 | 80 | 2.50 | 6.845 | 23.50 | 62.5 |
| 2 | 82 | 2.50 | 6.845 | 21.65 | 62.5 |
| 3 | 84 | 2.50 | 6.845 | 19.61 | 62.5 |
| 4 | 86 | 2.50 | 6.845 | 17.02 | 62.5 |
| 5 | 90 | 3.15 | 8.60 | 23.68 | 62.5 |
| 6 | 92 | 2.96 | 8.32 | 19.06 | 62.5 |
| 7 | 94 | 2.97 | 8.36 | 19.43 | 62.5 |

TABLE 2

| Sample | Trace | $\Delta_{1max}$ (%) | $\Delta_{1min}$ (%) | $\Delta_3$ (%) | $\Delta_{3min}$ (%) | $\Delta_{4max}$ (%) | Trench Volume (% µm$^2$) |
|---|---|---|---|---|---|---|---|
| 1 | 80 | 0.089 | −0.306 | −0.324 | −0.376 | −0.251 | 46.25 |
| 2 | 82 | 0.089 | −0.306 | −0.324 | −0.375 | −0.266 | 29.29 |
| 3 | 84 | 0.089 | −0.306 | −0.324 | −0.371 | −0.276 | 17.99 |
| 4 | 86 | 0.089 | −0.306 | −0.324 | −0.358 | −0.290 | 8.74 |
| 5 | 90 | 0.029 | −0.211 | −0.242 | −0.274 | −0.162 | 38.61 |
| 6 | 92 | 0.023 | −0.236 | −0.256 | −0.284 | −0.189 | 18.12 |
| 7 | 94 | 0.024 | −0.236 | −0.256 | −0.285 | −0.210 | 14.57 |

Selected optical properties of the optical fiber samples are listed in Table 3. MFD refers to mode field diameter at 1550 nm, dispersion refers to dispersion at 1550 nm, cable cutoff refers to the cable cutoff wavelength, and $A_{eff}$ refers to effective area at 1550 nm.

TABLE 3

| Sample | Trace | MFD (µm) | $A_{eff}$ (µm$^2$) | Cable Cutoff (nm) | Dispersion (ps/nm-km) |
|---|---|---|---|---|---|
| 1 | 80 | 12.00 | 113.01 | 1453 | 20.21 |
| 2 | 82 | 12.02 | 113.01 | 1450 | 20.21 |
| 3 | 84 | 12.02 | 113.01 | 1452 | 20.21 |
| 4 | 86 | 12.03 | 113.02 | 1449 | 20.21 |
| 5 | 90 | 14.11 | 157.21 | 1408 | 21.02 |
| 6 | 92 | 13.68 | 148.53 | 1341 | 20.95 |
| 7 | 94 | 13.78 | 150.07 | 1464 | 21.08 |

Figure 7A:
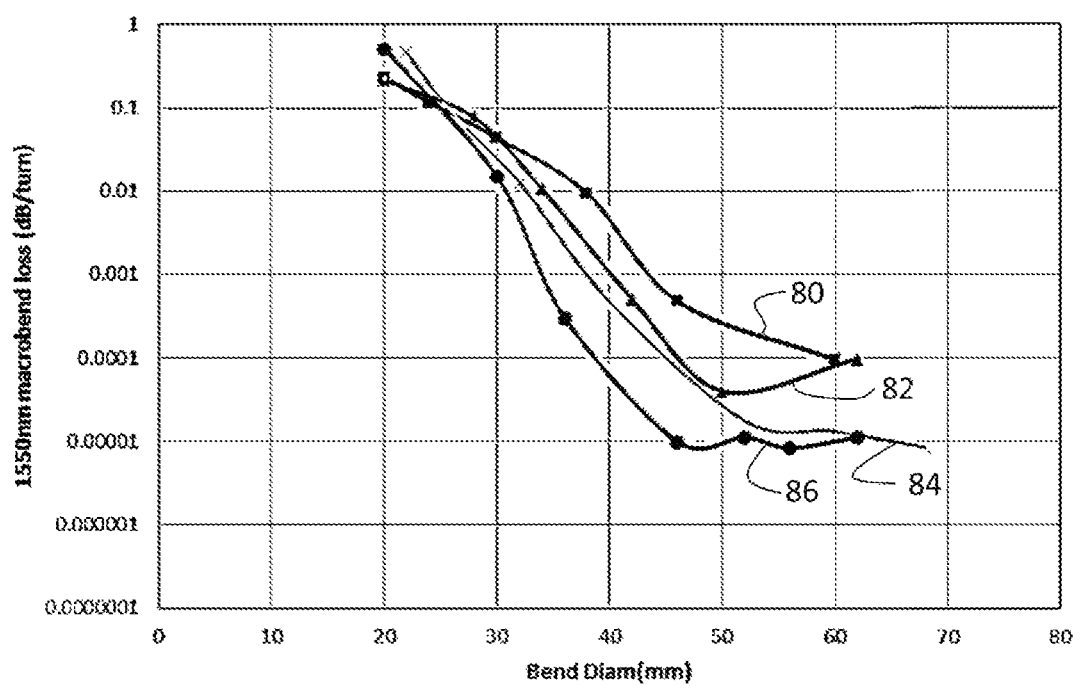
FIG. 7A shows the dependence of macrobend loss at 1550 nm on bend diameter for glass fibers having the relative refractive index profiles shown in FIG. 6A.
Figure 7B:
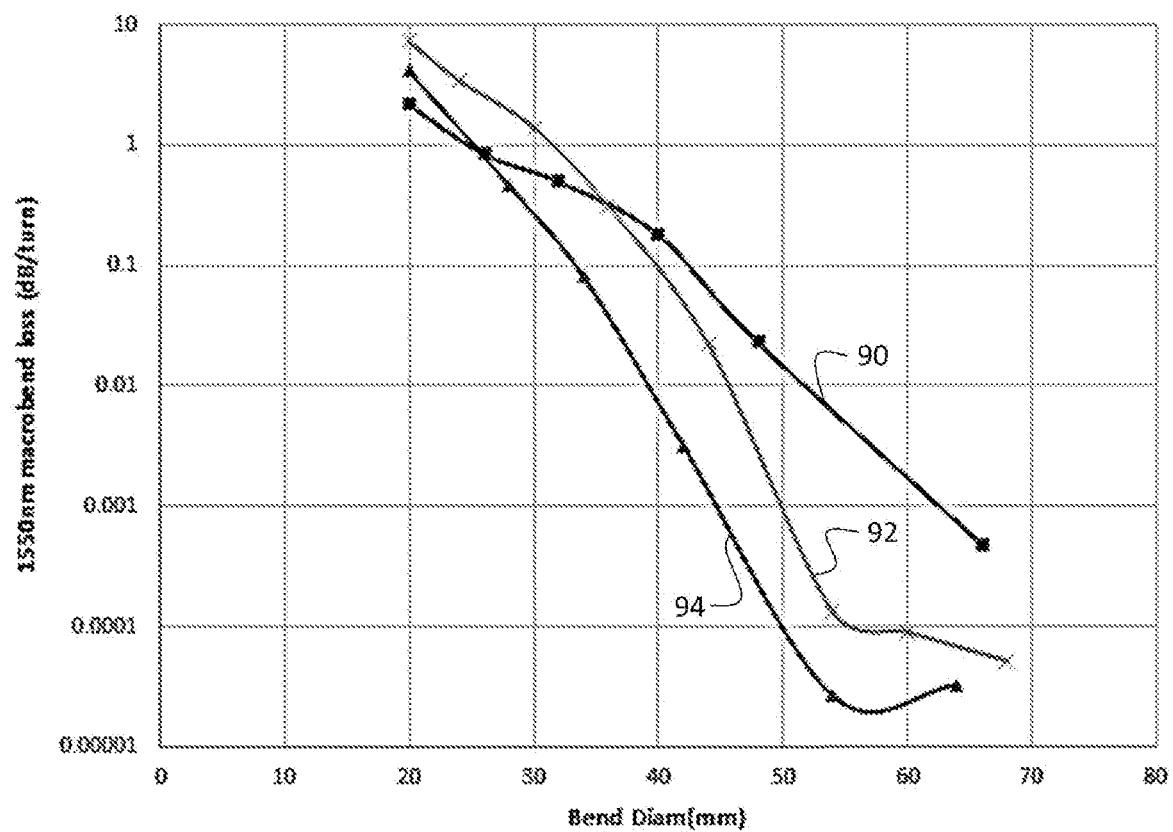
FIG. 7B shows the dependence of macrobend loss at 1550 nm on bend diameter for glass fibers having the relative refractive index profiles shown in FIG. 6B.

The macrobend loss at 1550 nm for each of the samples at various bend diameters is shown in FIGS. 7A and 7B. Samples 1-4 have the same core characteristics and differ in trench volume. As shown in traces 80, 82, 84, and 86 of FIG. 6A, a progressive decrease in trench volume occurs for Samples 1-4 through reductions in radius $r_3$, trench cladding region thickness $r_3-r_2$, and relative refractive index of the outer cladding region ($\Delta_4$ and $\Delta_{4max}$). FIG. 7A shows that as trench volume decreases, macrobending loss decreases. The decrease in macrobending loss is particular pronounced at large bend diameters. At bend diameters less than about 30 mm, Samples 1-4 exhibit similar macrobending loss. As bend diameter increases above 30 mm, a significant improvement in macrobend loss occurs as trench volume decreases (compare, for example, Sample 1 (trace 80) and Sample 2 (trace 86)). A similar result is observed in FIGS. 6B and 7B for Samples 5-7.

Samples 1 and 5 are control samples consistent with optical fibers currently used in submarine telecommunications systems. Both samples exhibit large trench volumes. Samples 2-4 and 6-7 are exemplary optical fibers having trench volumes in accordance with the present disclosure. The results indicate that while optical fibers having relative refractive index profiles with large trench volumes have low macrobend losses at small bend diameters, the macrobend loss is high at larger bend diameters. Optical fibers having the trench volumes disclosed herein provide superior performance with respect to macrobend loss at large bend diameters.

The macrobend loss at 1550 nm of optical fibers disclosed herein, as determined by the mandrel wrap test using a mandrel with a diameter of 50 mm, is less than 0.001 dB/turn, or less than 0.0005 dB/turn, or less than 0.0001 dB/turn, or less than 0.00005 dB/turn, or less than 0.00001 dB/turn.

The macrobend loss at 1550 nm of optical fibers disclosed herein, as determined by the mandrel wrap test using a mandrel with a diameter of 55 mm, is less than 0.0001 dB/turn, or less than 0.00005 dB/turn, or less than 0.00003 dB/turn, or less than 0.00001 dB/turn.

The macrobend loss at 1550 nm of optical fibers disclosed herein, as determined by the mandrel wrap test using a mandrel with a diameter of 60 mm, is less than 0.0001 dB/turn, or less than 0.00005 dB/turn, or less than 0.00003 dB/turn, or less than 0.00001 dB/turn.

The macrobend loss at 1550 nm of optical fibers disclosed herein, as determined by the mandrel wrap test using a mandrel with a diameter of 65 mm, is less than 0.0001 dB/turn, or less than 0.00005 dB/turn, or less than 0.00003 dB/turn, or less than 0.00001 dB/turn.

The macrobend loss at 1550 nm of optical fibers disclosed herein, as determined by the mandrel wrap test using a mandrel with a diameter of 70 mm, is less than 0.0001 dB/turn, or less than 0.00005 dB/turn, or less than 0.00003 dB/turn, or less than 0.00001 dB/turn.

The mode field diameter at 1550 nm of optical fibers disclosed herein is greater than 11.0 µm, or greater than 11.5 µm, or greater than 12.0 µm, or greater than 12.5 µm, or greater than 13.0 µm, or greater than 13.5 µm, or greater than 14.0 µm, or in the range from 11.0 µm to 15.0 µm, or in the range from 12.0 µm to 15.0 µm, or in the range from 12.5 µm to 14.5 µm.

The effective area at 1550 nm of the optical fibers disclosed herein is greater than 110 µm$^2$, or greater than 120 µm$^2$, or greater than 130 µm$^2$, or greater than 140 µm$^2$, or greater than 150 µm$^2$, or in the range from 110 µm$^2$ to 165 µm$^2$, or in the range from 120 µm$^2$ to 150 µm$^2$.

The dispersion at 1550 nm of the optical fibers disclosed herein is less than 25.0 ps/ns-km, or less than 23.0 ps/ns-km, or less than 21.0 ps/ns-km, or in the range from less than 20.0 ps/ns-km to 25.0 ps/ns-km.

The cable cutoff wavelength of the optical fibers disclosed herein is less than 1530 nm, or less than 1500 nm, or less Aspect 1 of the description is:

An optical fiber comprising:
 a core region, the core region having a radius $r_1$ in a range from 4.0 µm to 10.0 µm and a relative refractive index profile $\Delta_1$ having a maximum relative refractive index $\Delta_{1max}$ in a range from −0.05% to 0.05%;
 a cladding region surrounding and directly adjacent to the core region, the cladding region comprising:
  a trench cladding region surrounding the core region, the trench cladding region comprising silica glass and having a radius $r_3$, a relative refractive index $\Delta_3$, and a trench volume less than 35% µm²; and
  an outer cladding region surrounding and directly adjacent to the trench cladding region, the outer cladding region comprising silica glass having a radius $r_4$ and a relative refractive index $\Delta_4$ in a range from −0.45% to −0.15%; and
 wherein the optical fiber has a macrobend loss at 1550 nm, as determined by a mandrel wrap test using a mandrel with a diameter of 50 mm, less than 0.001 dB/turn.

Aspect 2 of the description is:
The optical fiber of Aspect 1, wherein the radius $r_1$ is in a range from 5.0 µm to 9.5 µm.

Aspect 3 of the description is:
The optical fiber of Aspect 1, wherein the radius $r_1$ is in a range from 6.0 µm to 9.0 µm.

Aspect 4 of the description is:
The optical fiber of any of Aspects 1-3, wherein the maximum relative refractive index $\Delta_{1max}$ is in a range from −0.03% to 0.03%.

Aspect 5 of the description is:
The optical fiber of any of Aspects 1-3, wherein the maximum relative refractive index $\Delta_{1max}$ is in a range from −0.01% to 0.01%.

Aspect 6 of the description is:
The optical fiber of any of Aspects 1-5, wherein the core region is a segmented core region comprising an inner core region and an outer core region surrounding and directly adjacent to the inner core region, the inner core region having a radius $r_a$ in a range from 0.5 µm to 3.5 µm and comprising the maximum relative refractive index $\Delta_{1max}$, the outer core region comprising the radius $r_1$ and having a minimum relative refractive index $\Delta_{1min}$ in a range from −0.40% to −0.10%.

Aspect 7 of the description is:
The optical fiber of Aspect 6, wherein the inner core region comprises a relative refractive index profile defined by an α-profile with a value of a less than 10 and the outer core region comprises a relative refractive index profile defined by an α-profile with a value of a greater than 10.

Aspect 8 of the description is:
The optical fiber of Aspect 6 or 7, wherein the inner core region comprises silica glass doped with an alkali metal oxide.

Aspect 9 of the description is:
The optical fiber of any of Aspects 6-8, wherein the outer core region comprises silica glass doped with fluorine.

Aspect 10 of the description is:
The optical fiber of any of Aspects 1-5, wherein the core region comprises undoped silica glass.

Aspect 11 of the description is:
The optical fiber of any of Aspects 1-5, wherein the core region comprises silica glass doped with an alkali metal oxide.

Aspect 12 of the description is:
The optical fiber of any of Aspects 1-5, wherein the core region comprises silica glass doped with germanium oxide.

Aspect 13 of the description is:
The optical fiber of any of Aspects 1-12, wherein the trench cladding region surrounds and is directly adjacent to an offset cladding region, the offset cladding region surrounding and directly adjacent to the core region, the offset cladding region having a radius $r_2$ and a relative refractive index $\Delta_2$ greater than or equal to the relative refractive index $\Delta_4$.

Aspect 14 of the description is:
The optical fiber of Aspect 13, wherein the offset cladding region has a thickness $r_2-r_1$ in the range from 0.5 µm to 5.0 µm.

Aspect 15 of the description is:
The optical fiber of any of Aspects 1-12, wherein the trench cladding region is directly adjacent to the core region.

Aspect 16 of the description is:
The optical fiber of Aspect 15, wherein the trench cladding region has a thickness $r_3-r_1$ less than 20.0 µm.

Aspect 17 of the description is:
The optical fiber of Aspect 15, wherein the trench cladding region has a thickness $r_3-r_1$ less than 15.0 µm.

Aspect 18 of the description is:
The optical fiber of Aspect 15, wherein the trench cladding region has a thickness $r_3-r_1$ less than 10.0 µm.

Aspect 19 of the description is:
The optical fiber of any of Aspects 1-18, wherein the radius $r_3$ is in a range from 12.0 µm to 30.0 µm.

Aspect 20 of the description is:
The optical fiber of any of Aspects 1-18, wherein the radius $r_3$ is in a range from 15.0 µm to 27.5 µm.

Aspect 21 of the description is:
The optical fiber of any of Aspects 1-18, wherein the radius $r_3$ is in a range from 17.5 µm to 25.0 µm.

Aspect 22 of the description is:
The optical fiber of any of Aspects 1-21, wherein the relative refractive index $\Delta_3$ is in a range from −0.20% to −0.50%.

Aspect 23 of the description is:
The optical fiber of any of Aspects 1-21, wherein the relative refractive index $\Delta_3$ is in a range from −0.25% to −0.45%.

Aspect 24 of the description is:
The optical fiber of any of Aspects 1-21, wherein the relative refractive index $\Delta_3$ is in a range from −0.30% to −0.40%.

Aspect 25 of the description is:
The optical fiber of any of Aspects 1-24, wherein the trench volume is less than 30% µm².

Aspect 26 of the description is:
The optical fiber of any of Aspects 1-24, wherein the trench volume is less than 25% µm².

Aspect 27 of the description is:
The optical fiber of any of Aspects 1-24, wherein the trench volume is less than 20% µm².

Aspect 28 of the description is:
The optical fiber of any of Aspects 1-24, wherein the trench volume is less than 15% µm².

Aspect 29 of the description is:
The optical fiber of any of Aspects 1-28, wherein the relative refractive index $\Delta_4$ in a range from −0.40% to −0.20%.

Aspect 30 of the description is:
The optical fiber of any of Aspects 1-28, wherein the relative refractive index $\Delta_4$ in a range from −0.35% to −0.25%.

Aspect 31 of the description is:
The optical fiber of any of Aspects 1-30, wherein a difference between the relative refractive index $\Delta_4$ and the relative refractive index $\Delta_3$ is less than 0.15%.

than 1450 nm, or less than 1400 nm, or less than 1350 nm, or in the range from 1250 nm to 1500 nm, or in the range from 1300 nm to 1450 nm.

Aspect 32 of the description is:
The optical fiber of any of Aspects 1-30, wherein a difference between the relative refractive index $\Delta_4$ and the relative refractive index $\Delta_3$ is less than 0.10%.

Aspect 33 of the description is:
The optical fiber of any of Aspects 1-30, wherein a difference between the relative refractive index $\Delta_4$ and the relative refractive index $\Delta_3$ is less than 0.05%.

Aspect 34 of the description is:
The optical fiber of any of Aspects 1-33, wherein the optical fiber has a macrobend loss at 1550 nm, as determined by a mandrel wrap test using a mandrel with a diameter of 50 mm, less than 0.0005 dB/turn.

Aspect 35 of the description is:
The optical fiber of any of Aspects 1-33, wherein the optical fiber has a macrobend loss at 1550 nm, as determined by a mandrel wrap test using a mandrel with a diameter of 50 mm, less than 0.0001 dB/turn.

Aspect 36 of the description is:
The optical fiber of any of Aspects 1-33, wherein the optical fiber has a macrobend loss at 1550 nm, as determined by a mandrel wrap test using a mandrel with a diameter of 50 mm, less than 0.00005 dB/turn.

Aspect 37 of the description is:
The optical fiber of any of Aspects 1-36, wherein the optical fiber has a macrobend loss at 1550 nm, as determined by a mandrel wrap test using a mandrel with a diameter of 55 mm, less than 0.0001 dB/turn.

Aspect 38 of the description is:
The optical fiber of any of Aspects 1-36, wherein the optical fiber has a macrobend loss at 1550 nm, as determined by a mandrel wrap test using a mandrel with a diameter of 55 mm, less than 0.00005 dB/turn.

Aspect 39 of the description is:
The optical fiber of any of Aspects 1-36, wherein the optical fiber has a macrobend loss at 1550 nm, as determined by a mandrel wrap test using a mandrel with a diameter of 55 mm, less than 0.00003 dB/turn.

Aspect 40 of the description is:
The optical fiber of any of Aspects 1-39, wherein the optical fiber has a macrobend loss at 1550 nm, as determined by a mandrel wrap test using a mandrel with a diameter of 60 mm, less than 0.0001 dB/turn.

Aspect 41 of the description is:
The optical fiber of any of Aspects 1-39, wherein the optical fiber has a macrobend loss at 1550 nm, as determined by a mandrel wrap test using a mandrel with a diameter of 60 mm, less than 0.00005 dB/turn.

Aspect 42 of the description is:
The optical fiber of any of Aspects 1-39, wherein the optical fiber has a macrobend loss at 1550 nm, as determined by a mandrel wrap test using a mandrel with a diameter of 60 mm, less than 0.00003 dB/turn.

Aspect 43 of the description is:
The optical fiber of any of Aspects 1-42, wherein the optical fiber has a macrobend loss at 1550 nm, as determined by a mandrel wrap test using a mandrel with a diameter of 65 mm, less than 0.0001 dB/turn.

Aspect 44 of the description is:
The optical fiber of any of Aspects 1-42, wherein the optical fiber has a macrobend loss at 1550 nm, as determined by a mandrel wrap test using a mandrel with a diameter of 65 mm, less than 0.00005 dB/turn.

Aspect 45 of the description is:
The optical fiber of any of Aspects 1-42, wherein the optical fiber has a macrobend loss at 1550 nm, as determined by a mandrel wrap test using a mandrel with a diameter of 65 mm, less than 0.00003 dB/turn.

Aspect 46 of the description is:
The optical fiber of any of Aspects 1-45, wherein the optical fiber has a macrobend loss at 1550 nm, as determined by a mandrel wrap test using a mandrel with a diameter of 70 mm, less than 0.0001 dB/turn.

Aspect 47 of the description is:
The optical fiber of any of Aspects 1-45, wherein the optical fiber has a macrobend loss at 1550 nm, as determined by a mandrel wrap test using a mandrel with a diameter of 70 mm, less than 0.00005 dB/turn.

Aspect 48 of the description is:
The optical fiber of any of Aspects 1-45, wherein the optical fiber has a macrobend loss at 1550 nm, as determined by a mandrel wrap test using a mandrel with a diameter of 70 mm, less than 0.00003 dB/turn.

Aspect 49 of the description is:
The optical fiber of any of Aspects 1-48, wherein the optical fiber has a mode field diameter at 1550 nm greater than 12.0 µm.

Aspect 50 of the description is:
The optical fiber of any of Aspects 1-48, wherein the optical fiber has a mode field diameter at 1550 nm greater than 14.0 µm.

Aspect 51 of the description is:
The optical fiber of any of Aspects 1-48, wherein the optical fiber has an effective area at 1550 nm greater than 110 µm$^2$.

Aspect 52 of the description is:
The optical fiber of any of Aspects 1-48, wherein the optical fiber has an effective area at 1550 nm greater than 140 µm$^2$.

Aspect 53 of the description is:
The optical fiber of any of Aspects 1-48, wherein the optical fiber has a cable cutoff wavelength less than 1530 nm.

Aspect 54 of the description is: An optical fiber ribbon comprising the optical fiber of any of Aspects 1-53.

Aspect 55 of the description is: An optical fiber cable comprising the optical fiber of any of Aspects 1-53.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:
1. An optical fiber comprising:
a core region, the core region having a radius $r_1$ in a range from 4.0 µm to 10.0 µm and a relative refractive index profile $\Delta_1$ having a maximum relative refractive index $\Delta_{1max}$ in a range from −0.05% to 0.05% and a minimum relative refractive index $\Delta_{1min} < \Delta_{1max}$;
a cladding region surrounding and directly adjacent to the core region, the cladding region comprising:
a trench cladding region surrounding the core region, the trench cladding region comprising silica glass and having a radius $r_3$, a relative refractive index $\Delta_3$, and a trench volume less than 35%µm$^2$; and an outer cladding region surrounding and directly adjacent to the trench cladding region, the outer cladding region comprising silica glass having a radius $r_4$ and a relative refractive index $\Delta_4$ in a range from −0.45% to −0.15%; and wherein the optical fiber has a macrobend loss at 1550 nm, as determined by a mandrel wrap test using a mandrel with a diameter of 50 mm, less than 0.001 dB/turn.

2. The optical fiber of claim 1, wherein the radius $r_1$ is in a range from 6.0 µm to 9.0 µm.

3. The optical fiber of claim 1, wherein the maximum relative refractive index $\Delta_{1max}$ is in a range from −0.01% to 0.01%.

4. The optical fiber of claim 1, wherein the core region is a segmented core region comprising an inner core region and an outer core region surrounding and directly adjacent to the inner core region, the inner core region having a radius $r_a$ in a range from 0.5 µm to 3.5 µm and comprising the maximum relative refractive index $\Delta_{1max}$, the outer core region comprising the radius $r_1$ and having a minimum relative refractive index $\Delta_{1min}$ in a range from −0.40% to −0.10%.

5. The optical fiber of claim 4, wherein the inner core region comprises a relative refractive index profile defined by an α-profile with a value of α less than 10 and the outer core region comprises a relative refractive index profile defined by an α-profile with a value of α greater than 10.

6. The optical fiber of claim 4, wherein the outer core region comprises a relative refractive index profile defined by an α-profile with a value of α greater than 20.

7. The optical fiber of claim 1, wherein the core region comprises undoped silica glass.

8. The optical fiber of claim 1, wherein the core region comprises silica glass doped with an alkali metal oxide.

9. The optical fiber of claim 1, wherein the core region comprises silica glass doped with germanium oxide.

10. The optical fiber of claim 1, wherein the trench cladding region surrounds and is directly adjacent to an offset cladding region, the offset cladding region surrounding and directly adjacent to the core region, the offset cladding region having a radius $r_2$ and a relative refractive index $\Delta_2$ less than or equal to the minimum relative refractive index $\Delta_{1min}$.

11. The optical fiber of claim 10, wherein the offset cladding region has a thickness $r_2-r_1$ in the range from 0.5 µm to 5.0 µm.

12. The optical fiber of claim 1, wherein the trench cladding region is directly adjacent to the core region.

13. The optical fiber of claim 12, wherein the trench cladding region has a thickness $r_3-r_1$ less than 20.0 µm.

14. The optical fiber of claim 12, wherein the trench cladding region has a thickness $r_3-r_1$ less than 10.0 µm.

15. The optical fiber of claim 1, wherein the radius $r_3$ is in a range from 12.0 µm to 30.0 µm.

16. The optical fiber of claim 1, wherein the relative refractive index $\Delta_3$ is in a range from −0.20% to −0.50%.

17. The optical fiber of claim 1, wherein the trench volume is less than 25%µm².

18. The optical fiber of claim 1, wherein the relative refractive index $\Delta_4$ in a range from −0.35% to −0.25%.

19. The optical fiber of claim 1, wherein a difference between the relative refractive index $\Delta_4$ and the relative refractive index $\Delta_3$ is less than 0.10%.

20. The optical fiber of claim 1, wherein the optical fiber has a macrobend loss at 1550 nm, as determined by a mandrel wrap test using a mandrel with a diameter of 50 mm, less than 0.0001 dB/turn.

21. The optical fiber of claim 1, wherein the optical fiber has a macrobend loss at 1550 nm, as determined by a mandrel wrap test using a mandrel with a diameter of 60 mm, less than 0.0001 dB/turn.

22. The optical fiber of claim 1, wherein the optical fiber has a macrobend loss at 1550 nm, as determined by a mandrel wrap test using a mandrel with a diameter of 70 mm, less than 0.0001 dB/turn.

23. The optical fiber of claim 1, wherein the optical fiber has a cable cutoff wavelength less than 1530 nm.

24. An optical fiber ribbon comprising the optical fiber of claim 1.

25. An optical fiber cable comprising the optical fiber of claim 1.

26. The optical fiber of claim 1, wherein the radius $r_3$ is in a range from 17.5 µm to 25.0 µm.

27. The optical fiber of claim 1, wherein the relative refractive index $\Delta_3$ is in a range from −0.30% to −0.40%.

28. The optical fiber of claim 1, wherein the trench volume is less than 20%µm².

29. The optical fiber of claim 1, wherein the radius $r_4$ is in a range from 61.0 µm to 64.0 µm.

30. The optical fiber of claim 1, wherein the optical fiber has a macrobend loss at 1550 nm, as determined by a mandrel wrap test using a mandrel with a diameter of 50 mm, less than 0.0005 dB/turn.

31. The optical fiber of claim 1, wherein the optical fiber has a macrobend loss at 1550 nm, as determined by a mandrel wrap test using a mandrel with a diameter of 50 mm, less than 0.0001 dB/turn.

32. The optical fiber of claim 1, wherein the optical fiber has a macrobend loss at 1550 nm, as determined by a mandrel wrap test using a mandrel with a diameter of 50 mm, less than 0.00005 dB/turn.

33. The optical fiber of claim 1, wherein a difference between the maximum relative refractive index $\Delta_{1max}$ and the minimum relative refractive index $\Delta_{1min}$ is greater than 0.15%.

34. The optical fiber of claim 1, wherein the trench cladding region has a thickness less than 12.5 µm.

35. The optical fiber of claim 1, wherein the relative refractive index $\Delta_3$ of the trench cladding region continuously decreases in the radial direction away from a centerline of the optical fiber.

* * * * *

UNITED STATES PATENT AND TRADEMARK OFFICE
CERTIFICATE OF CORRECTION

PATENT NO. : 11,506,835 B2
APPLICATION NO. : 17/082688
DATED : November 22, 2022
INVENTOR(S) : Peter Gottfried Hebgen et al.

It is certified that error appears in the above-identified patent and that said Letters Patent is hereby corrected as shown below:

In the Claims

In Column 28, Line 67, in Claim 1, delete "35%µm²;" and insert -- 35% µm²; --.

In Column 29, Line 28, in Claim 5, delete "a greater" and insert -- α greater --.

In Column 30, Line 2, in Claim 17, delete "25%µm²." and insert -- 25% µm². --.

In Column 30, Line 31, in Claim 28, delete "20%µm²." and insert -- 20% µm². --.

Signed and Sealed this
Eighth Day of August, 2023

Katherine Kelly Vidal
*Director of the United States Patent and Trademark Office*